W. A. MIDDLETON.
Corn Sheller.
No. 105,825.             Patented July 26, 1870.
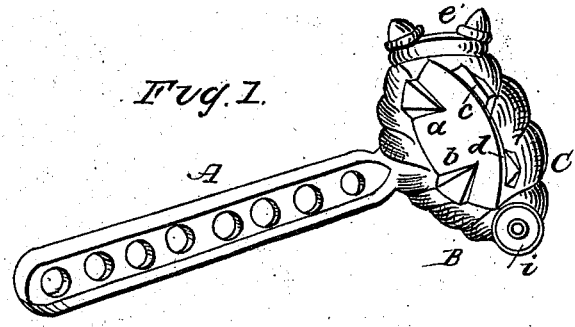
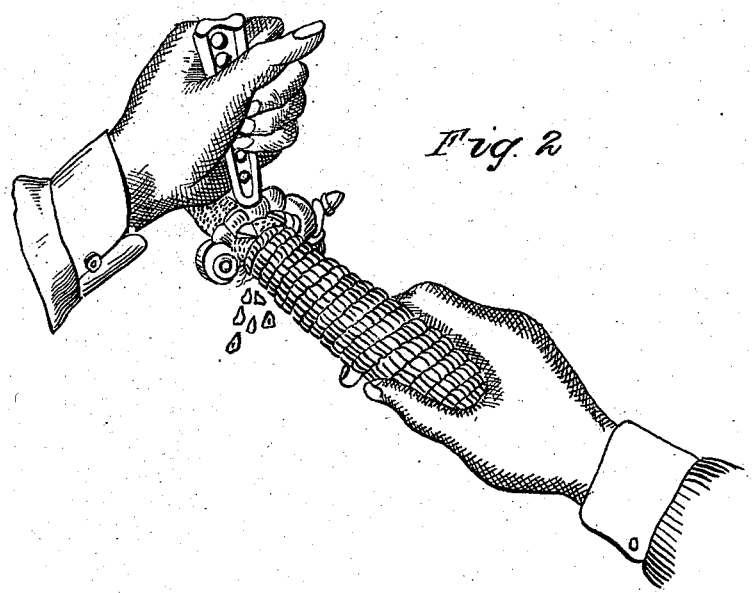
Witnesses
Wm. P. Fallon
G. F. Kunkel
Inventor
William A. Middleton

United States Patent Office.

WILLIAM A. MIDDLETON, OF HARRISBURG, PENNSYLVANIA.

Letters Patent No. 105,825, dated July 26, 1870.

IMPROVEMENT IN HAND CORN-SHELLER.

The Schedule referred to in these Letters Patent and making part of the same

To all whom it may concern:

Be it known that I, WILLIAM A. MIDDLETON, of the city of Harrisburg, county of Dauphin and State of Pennsylvania, have invented a new and useful Improvement in "Hand Corn-Shellers;" and I do hereby declare the following to be a full, clear, and exact description of the same and its manner of operation, reference being had to the accompanying drawing and letters of reference marked thereon.

In the drawing—

Figure 1 is a perspective view of the sheller.
Figure 2 shows the implement in use.

It is constructed as follows:

Two curved jaws, B C, are provided, that are pivoted together at $i$.

They are furnished with angular or V-shaped shelling-teeth, as shown. Two or more are rigidly attached or formed upon each jaw.

These jaws are held together at their free ends by the gum-band spring $e$, that is held in place by the knobs or projections shown.

The curved jaw B has the handle A cast upon or otherwise rigidly attached to it, as shown in fig. 1.

This invention is designed as an improvement upon the corn-sheller patented by William P. Patton and William A. Middleton, on the 25th January, 1870, numbered 99,106.

Said patent corn-sheller has similar-shaped jaws and shelling-teeth, but, from its manner of construction, requires the corn to be rotated by the hand in the act of shelling, which proves tiresome to the operator.

In the present invention a handle is provided that enables the operator to vibrate the sheller upon the cob while using it, and thus relieve the arm and hand that grasps the corn from strain and fatigue.

The manner of use is plainly shown in fig. 2 of the drawing.

I do not desire, therefore, to claim, broadly, the construction of the jaws or teeth in this invention; but What I do claim, and desire to secure by Letters Patent of the United States, is—

The combination of the hinged jaws B and C, provided with the triangular-shaped teeth $a\ b\ c\ d$, the spring $e$, and operating handle A, when said parts are constructed and arranged to operate in the manner and for the purpose specified.

WILLIAM A. MIDDLETON. [L. S.]

Witnesses;
G. J. KUNKEL,
WM. P. PATTON.